United States Patent [19]
Gibbs

[11] 3,786,225
[45] Jan. 15, 1974

[54] WELDING FIXTURE

[75] Inventor: Francis E. Gibbs, Pleasanton, Calif.

[73] Assignee: Kaiser Aluminum & Chemical Corporation, Oakland, Calif.

[22] Filed: Dec. 7, 1972

[21] Appl. No.: 312,902

[52] U.S. Cl.............................. 219/124, 219/137
[51] Int. Cl............................................ B23k 9/12
[58] Field of Search............... 219/124, 125 R, 126, 219/130, 137, 73

[56] References Cited
UNITED STATES PATENTS
3,594,534   7/1971   Benfield.......................... 219/125 R
2,726,618   12/1955  Tschudi................................ 228/27
3,253,117   5/1966   Brems................................ 219/130

Primary Examiner—C. L. Albritton
Attorney—Paul E. Calrow et al.

[57] ABSTRACT

A fixture for the welding of metal products which provides a pivotal mode of oscillation of the welding torch about the tip of the torch. The pivotal mode of oscillation is particularly effective in the arc welding of thick members with a narrow welding groove.

8 Claims, 4 Drawing Figures

3,786,225

WELDING FIXTURE

BACKGROUND OF THE INVENTION

This invention relates to the welding of metal products and in particular a welding torch fixture suitable for the welding of thick metal plates. The arc welding of metal products with an inert gas shielded consumable electrode (commonly termed GMA or MIG welding) is an efficient welding process which forms sound weldments in both ferrous and nonferrous metals. However, the GMA welding of thick metal plates, such as are employed in the construction of large tanks for LNG tankers, is both time-consuming and quite expensive. To minimize welding time and the amount of weld filler metal, the welding groove can be narrowed, but then the manipulation of the electrode in the groove is difficult and a poor weldment quality usually results.

Against this background, the present invention was developed.

DESCRIPTION OF THE INVENTION

The present invention provides for an improved welding torch fixture for the GMA welding of metal products, particularly thick metal plates, i.e., greater than three-fourth inch thick, and the method of welding metal products with said fixture. More particularly, the invention relates to a welding fixture wherein the welding gun is mounted so as to oscillate about an axis of rotation which passes through the tip of the welding gun. The oscillating movement of the electrode is essentially a pivotal movement about the intersection of the axis of the electrode and the aforesaid axis of rotation. By means of this device, the welding of thick plate with a narrow welding groove becomes practical and results in sound weldments. Moreover, the fixture is easily modified to provide a strictly lateral mode of oscillation in addition to the pivotal mode described above. The fixture can be employed in flat, horizontal or vertical welding.

Figure 1:
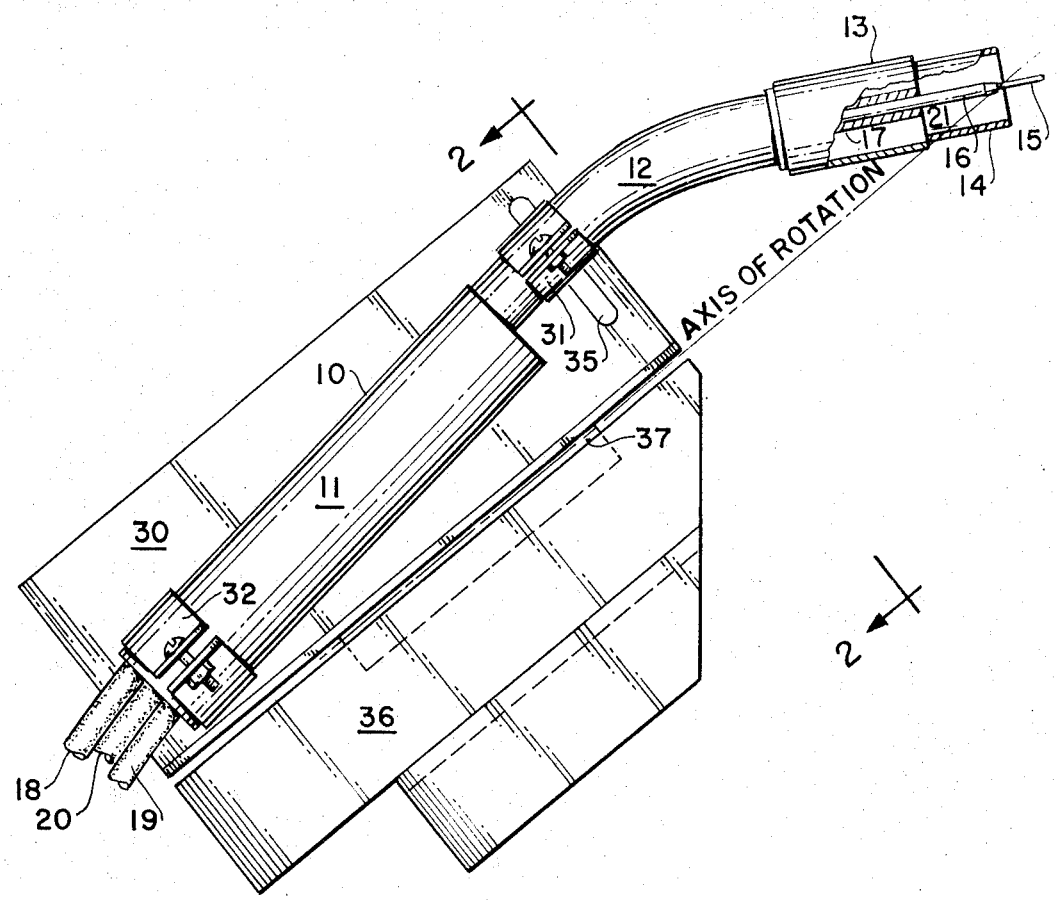
FIG. 1 is a side view of the fixture of the present invention with parts shown in section for purposes of clarity.
Figure 2:
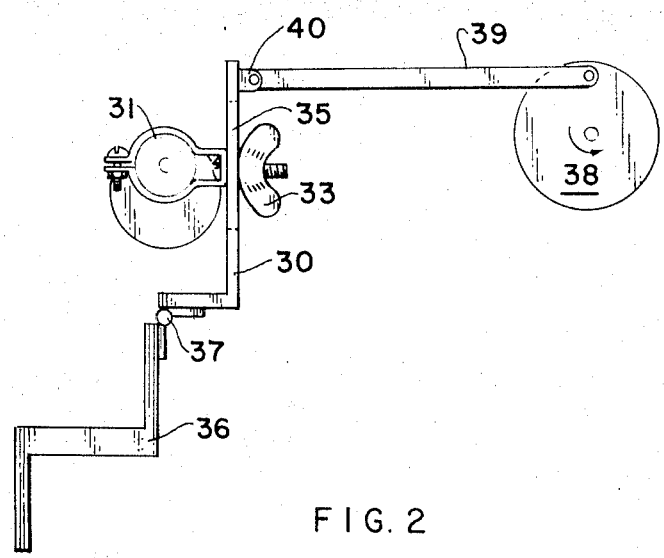
FIG. 2 is a sectional view taken along lines 2—2 in FIG. 1.

Reference is made to FIGS. 1 and 2 which represent respectively side and sectional views of a simplified preferred embodiment of the present invention. FIG. 1 is shown partially in section for purposes of clarity. The welding gun assembly 10, preferably of gooseneck shape, comprises a gun body 11, a curved or angular neck portion 12 and a gun nozzle 13. As shown in section in FIG. 1 the gun nozzle 13 comprises a gas shield 4, consumable electrode 15, contact tube 16 and collet means 17 for positioning the contact tube 16 within the gun nozzle 13. The contact tube 16 generally provides the current to the electrode and also positions and guides the electrode within the gun nozzle 13. Inert gas is supplied to the gun assembly through conduit 18; power is supplied through cable 19 and the electrode wire is guided through conduit 20 to the contact tube 16. In operation the inert gas passes through the anulus 20 in the nozzle 12 to shield the consumable electrode 14, the electrical arc and the weld metal pool which is formed by the arc. The welding gun assembly 10 is mounted on member 30 by suitable means such as the collars 31 and 32 and wing nuts 33 and 34 (not shown). Slot 35 is provided to adjust the position of the welding gun on member 30. The mounting member 30 is attached to a support member 36 through hinge joint 37. Shown in FIG. 2 is oscillating means 38 which is connected through arm 39 to the mounting member by means of flexible or universal joint 40. As is evident from the drawing, rotation of means 38 provides the oscillation. Other suitable means of course could be used.

In accordance with the present invention the welding gun assembly 10 is mounted on member 30 so that the tip of the welding gun 10 lies on the axis of rotation of the hinged joint 37. With most commercially available welding guns the expression "tip of the welding gun" will be synonymous with the gun nozzle. However, because the length of the gun nozzle can vary considerably, the expression "tip of the welding gun" and the words of similar import are used herein to refer to the last two inches of the gun as measured along the axis of the electrode from the tip or end thereof.

Figure 3:
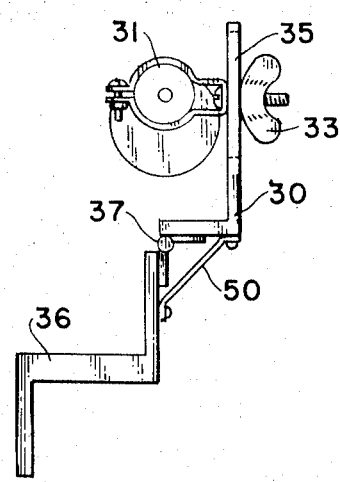
FIG. 3 is a front view of a modification of the invention.

As shown in FIGS. 1 and 2a slot or elongated aperture 35 is provided in member 30 to allow for changing the position of the tip of the electrode with respect to the axis of rotation of the joint 37. This provides improved latitude in the butt welding of thick members particularly with a narrow welding groove. For example in the root passes the gun may be positioned so that the end of the contact tube 16 lies on the hinge axis resulting in a pivotal mode of oscillating movement. After several passes the position of the welding gun can be changed so that the tip of the contact tube lies below the axis of rotation to provide an increased length of lateral electrode travel during each oscillation. Other modifications are also possible. For example, after the root passes as described above, a stiffener member 50 may be placed between the mounting member 30 and support member 36 as shown in FIG. 3 to render the hinge immobile so that when the unit is oscillated the mode of movement is strictly a lateral oscillation as compared with the pivotal mode in the root passes.

In the welding process according to the present invention the two members to be welded are positioned to form a generally U-shaped or V-shaped welding groove. A welding gun or torch, which includes a consumable electrode, a contact tube and an inert gas feeding means, is positioned adjacent the welding groove so that at least the tip of the electrode is in the groove and the gun is aligned with the longitudinal direction of the groove. An electrical arc is generated between the electrode and the workpiece, and the electrode, arc and weld pool which forms are shielded with a suitable inert gas such as argon, helium and combinations thereof. The welding torch is rotated through an angle somewhat less than 180° about an axis of rotation which passes through the tip of the welding torch so as to cause the arc to traverse the welding groove. Oscillation rates of about 5 to about 500 cycles per minute have been found to produce sound weldments. The pivotal mode of oscillation minimizes contact of the nozzle with the walls of the groove yet assures good wetting of the walls with the weld metal, i.e., a sound weldment. The angle may range from about 2° to 90° but for most applications an angle at about 5° to 50° is adequate. Preferably the axis of rotation should be at an angle greater than 10° from the workpiece surface.

Conventional GMA welding parameters can be employed with the process of the present invention. For example, in welding aluminum, the current can range from about 100–500 amps, voltage from about 10–40 volts, inert gas (preferably 75 percent helium-25 percent argon) flow rates from about 20–80 ft$^3$/hr, electrode feeding rates from about 2–10 /hr and torch travel rates from about 5–50 inches/min.

Figure 4:
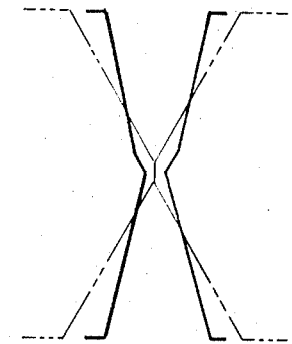
FIG. 4 is a cross-sectional view of a narrow welding groove which can be utilized with the present invention.

Reference is made to FIG. 4 wherein a narrow double V-groove is shown which can be employed with the welding fixture of the present invention. Superimposed in phantom is a conventional 60° double-V groove. With 4-inch thick aluminum plate, the conventional groove of FIG. 4 would require about 5.4 pounds of weld filler metal per linear foot, whereas, the narrow groove would require about 4.1 pounds of weld filler metal per linear foot.

The following example is given to further illustrate the present invention. Two 4.79 inch thick 5083 aluminum alloy plates were positioned in the vertical direction with the edges of the plates in abutting relationship. The edges of the plate were prepared so as to form a narrow double-V groove with a total welding groove cross-sectional area of 4.5 in$^2$. A model ST–19 gooseneck welding torch, manufactured by the Linde Division, Union Carbide Corporation, was positioned in a welding fixture of the present invention with the axis of rotation passing through the end of the contact tube. Employing a 1/16 inch diameter 5183 aluminum alloy welding wire, the plates were welded employing a current of 205–215 amps and an inert gas (75 percent helium – 25 percent argon) flow rate of about 65 cubic feet per hour. The electrode was oscillated at a rate of 60 cycles per minute and the angle of oscillation ranged from about 5°–30°. In all, 45 weld passes were required to completely fill the welding groove. As a comparison, a manual weld with a conventional 60° double-V groove with a cross-sectional area (8.6 in$^2$) requires about 75 passes.

As can be readily seen, the present invention provides for a substantial reduction in both the total welding time and the amount of weld filler material necessary in welding thick plates. This improvement can significantly reduce welding costs in the fabrication of large structures, such as the tanks which are employed in the bulk storage and transportation of liquids at cyrogenic temperatures. In these applications thousands of feet of high quality weldments are required to fully fabricate the entire structure and this welding presents a significant portion of the total cost of such a tank.

It is obvious that various modifications and improvements can be made to the present invention without departing from the spirit of the invention and the scope of the appended claims.

What is claimed is:

1. A fixture for the welding of metal products comprising in comination:
   a. a suport member;
   b. a mounting member hingedly joined to the upper portion of said support member;
   c. a welding torch mounted on the mounting member so the axis of rotation of said hinged joint passes through the tip of the welding torch; and
   d. means to oscillate the mounting member and the welding torch within an arc less than 180° about said axis of rotation.

2. The fixture of claim 1 wherein said torch comprises a consumable electrode, a contact tube to guide said electrode and an inert gas feeding means.

3. The fixture of claim 1 wherein said torch has a generally gooseneck shape.

4. The method of butt welding thick metal plates with a consumable electrode which is shielded by an inert gas comprising the steps of:
   a. positioning two plates edge to edge so as to form a U-shaped or V-shaped groove;
   b. positioning a welding torch, which comprises a consumable electrode, guide means for said electrode and an inert gas feeding means, adjacent said groove so the tip of said electrode is in the groove and the torch is in alignment with the groove;
   c. generating an electrical arc between the electrode and the bottom of the groove;
   d. shielding the electrode, the arc and the pool of molten metal formed by the arc with an inert gas;
   e. oscillating the arc by rotating the welding torch through an arc less than 180° about an axis of rotation, which passes through the tip of the welding torch.

5. The method of claim 4 wherein said metal plates are aluminum.

6. The method of claim 4 wherein said inert gas is a mixture of helium and argon.

7. The method of claim 4 wherein said arc is generated by passing a current from about 100 to 500 amps between the electrode and said plates.

8. The method of claim 4 wherein said arc is oscillated across the groove at a frequency from about 5 to about 500 cycles/min.

* * * * *